US011034387B2

(12) United States Patent
Moss et al.

(10) Patent No.: US 11,034,387 B2
(45) Date of Patent: Jun. 15, 2021

(54) VEHICLE BODY-VARIANT ADAPTABLE SHOCK TOWER SYSTEM

(71) Applicant: GM GLOBAL TECHNOLOGY OPERATIONS LLC, Detroit, MI (US)

(72) Inventors: Edward D. Moss, Commerce Township, MI (US); Mark J. McGuire, Amherstburg (CA); Peter M. Parlow, Columbus, MI (US); John J. Jackson, Chesterfield Township, MI (US); Jeffrey A. Mosher, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 81 days.

(21) Appl. No.: 16/514,133

(22) Filed: Jul. 17, 2019

(65) Prior Publication Data

US 2021/0016833 A1    Jan. 21, 2021

(51) Int. Cl.
| | |
|---|---|
| *B62D 25/08* | (2006.01) |
| *B62D 21/15* | (2006.01) |
| *B62D 21/09* | (2006.01) |
| *B62D 65/02* | (2006.01) |
| *B62D 21/08* | (2006.01) |

(52) U.S. Cl.
CPC ......... *B62D 25/088* (2013.01); *B62D 21/09* (2013.01); *B62D 21/152* (2013.01); *B62D 65/02* (2013.01); *B62D 21/08* (2013.01)

(58) Field of Classification Search
CPC ...... B62D 21/11; B62D 25/08; B62D 25/085; B62D 25/088; B62D 29/008; B62D 65/02; B62D 65/024

USPC .......... 296/203.01, 203.02, 203.04
See application file for complete search history.

(56) References Cited

U.S. PATENT DOCUMENTS

| | | | | |
|---|---|---|---|---|
| 5,344,187 A | * | 9/1994 | Kreis | B60G 15/068 280/124.155 |
| 7,404,596 B2 | * | 7/2008 | Miyata | B62D 25/088 296/203.02 |
| 7,703,805 B2 | * | 4/2010 | Sasaki | B62D 29/008 280/784 |
| 8,985,605 B2 | * | 3/2015 | Cho | B60G 13/003 280/124.155 |
| 9,517,796 B2 | * | 12/2016 | Balzer | B62D 27/02 |
| 10,286,961 B2 | * | 5/2019 | Hillebrecht | B62D 29/008 |

(Continued)

*Primary Examiner* — Jason S Daniels
(74) *Attorney, Agent, or Firm* — Quinn IP Law

(57) ABSTRACT

A vehicle body-variant adaptable shock tower system for a vehicle body structure having an axis, a vehicle frame rail arranged along the axis, a bulkhead arranged orthogonally relative to the frame rail. The system includes a shock tower spaced apart from the bulkhead and fixed to the frame rail. The system also includes a shock tower cap defining a plurality of receivers and a plurality of braces, wherein the number of braces corresponds to the body-variant. Each brace extends from the shock tower through a respective one of the receivers to the bulkhead, and is fixed to the shock tower and the bulkhead. The system additionally includes an adhesive applied between the shock tower cap, the plurality of braces, and the shock tower to thereby bond the shock tower cap, the braces, and the shock tower to each other and reinforce the vehicle body structure.

20 Claims, 4 Drawing Sheets

(56) References Cited

U.S. PATENT DOCUMENTS

2015/0076867 A1\* 3/2015 Bechtler .............. B62D 25/088
                                                    296/203.02
2015/0166117 A1\* 6/2015 Ohoka ................... B62D 25/08
                                                    296/193.09
2020/0039586 A1\* 2/2020 Ayuzawa ............. B62D 27/065

\* cited by examiner

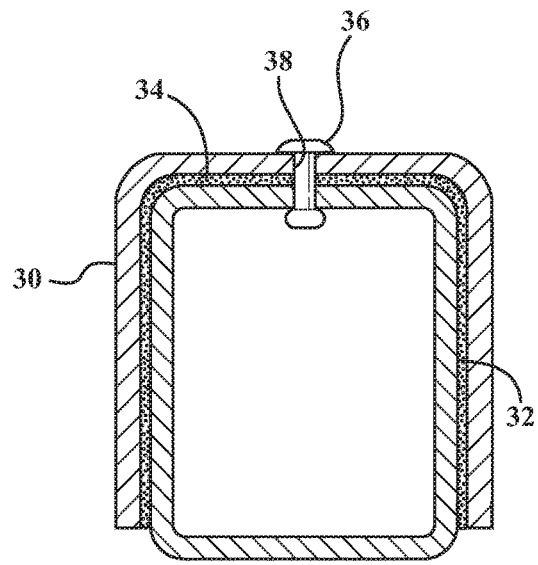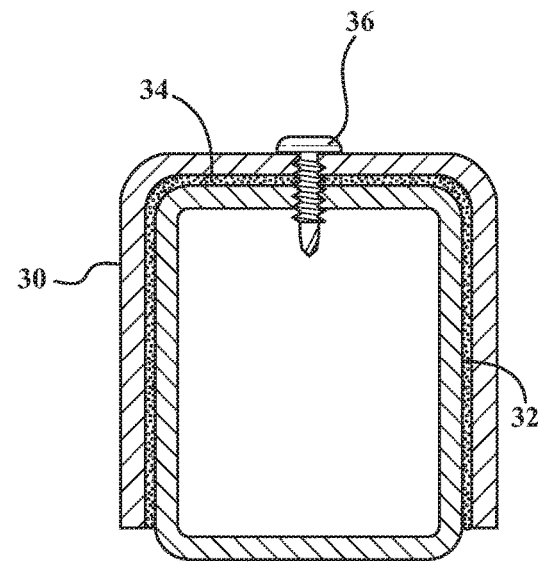
FIG. 5  FIG. 6
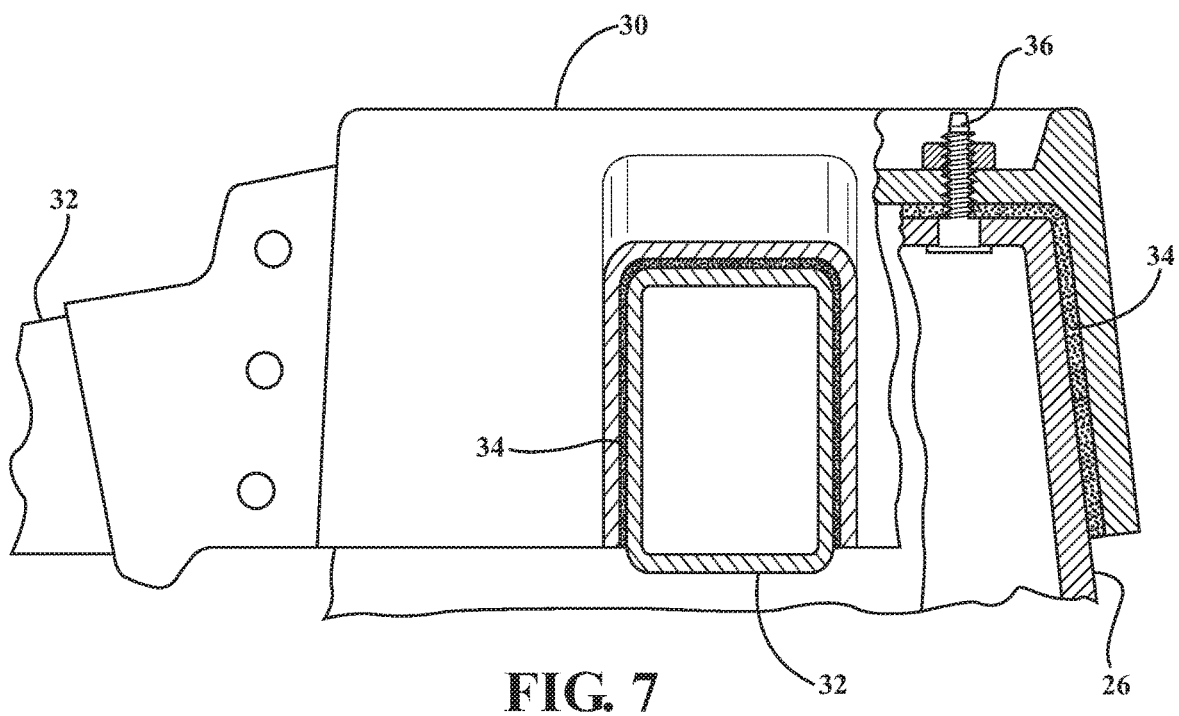
FIG. 7

VEHICLE BODY-VARIANT ADAPTABLE SHOCK TOWER SYSTEM

INTRODUCTION

The present disclosure relates to a motor vehicle body-variant adaptable structural shock tower system.

Typically, a vehicle includes a body structure for enclosing and supporting various vehicle systems, as well as the vehicle passengers. Heavy-duty vehicles, such as pick-up trucks and vans, commonly employ a frame to support a body and a powertrain of the vehicle. On the other hand, light-duty vehicles, such as a majority of passenger cars, often employ a monocoque or unibody construction that eschews a separate body and frame, in favor of a lighter, integrated structure. Additionally, some lighter-duty vehicles employ a combination or semi-monocoque structure with a subframe for carrying the vehicle's powertrain. Frequently, additional structural members are used to buttress the vehicle body structure, as well as for supporting various chassis and powertrain subsystems.

Integral frame and body construction requires more than simply attaching an unstressed body to a conventional frame. In a fully integrated body structure, the entire vehicle is a load-carrying unit that handles all the loads experienced by the vehicle, such as forces from driving and cargo. Integral-type bodies for wheeled vehicles are typically manufactured by welding preformed metal panels and other components together, by forming or casting whole sections as one piece, or by a combination of these techniques. Integral frame and body construction is generally lighter and more rigid than a vehicle having a separate body and frame.

In unibody vehicle construction, the frame, the exterior shell, and the chassis are made as a single structure, with box sections, bulkheads, and tubes providing additional rigidity, while the skin adds relatively little strength or stiffness. A true monocoque frame is basically a "skin" that supports various loads by distributing tension and compression across its surface, and lacks a load-carrying internal frame. Although such a structure is sometimes also referred to as monocoque, because the vehicle's outer skin and panels are made load-bearing, there are still ribs, bulkheads and box sections to reinforce the body, making the description semi-monocoque more appropriate.

SUMMARY

A vehicle body-variant adaptable shock tower system for a vehicle body structure having a vehicle body axis, a vehicle frame rail arranged substantially along the vehicle body axis, a bulkhead arranged orthogonally relative to the vehicle frame rail. The shock tower system includes a shock tower spaced apart from the bulkhead and fixed to the vehicle frame rail. The shock tower system also includes a shock tower cap defining a plurality of receivers and a plurality of braces, wherein the number of braces corresponds to the vehicle body-variant. Each brace extends from the shock tower through a respective one of the plurality of receivers to the bulkhead, and is fixed to the shock tower and the bulkhead. The shock tower system additionally includes an adhesive applied between the shock tower cap, the plurality of braces, and the shock tower to thereby bond the shock tower cap, the plurality of braces, and the shock tower to each other and reinforce the vehicle body structure.

The vehicle body-variant may be a coupe. In such a vehicle body-variant, the plurality of shock tower cap receivers may include two receivers, and the plurality of braces may include two braces. Additionally, each of the two braces may extend at an angle equal to or greater than 20 degrees relative to the vehicle body axis.

The vehicle body-variant may be a convertible. In such a vehicle body-variant, and the plurality of braces may include three braces. Additionally, a first one of the three braces may extend at an angle equal to or greater than 20 degrees relative to the vehicle body axis, a second one of the three braces may extend at an angle between zero and 10 degrees relative to the vehicle body axis, and a third one of the three braces may be a curved member extending from the shock tower orthogonally relative to the vehicle frame rail and extending from the bulkhead along the vehicle body axis.

The shock tower may be formed as a high-integrity aluminum die-casting.

The yield strength of the shock tower material may be in a range of 130-160 MPa.

The shock tower cap is a high-integrity aluminum die-casting.

The yield strength of the shock tower cap material is in a range of in a range of 130-160 MPa.

The shock tower system may additionally include a fastener configured to extend through shock tower cap and into one of the plurality of braces to thereby supplement the adhesive and fix the shock tower cap to the respective brace.

The shock tower cap may define a pre-generated, such as pre-formed, pre-machined, or pre-drilled, aperture configured to accept the fastener. In such an embodiment, the fastener may be a blind rivet.

The shock tower cap may be characterized by an absence of a pre-generated aperture configured to accept the fastener. In such an embodiment, the fastener may be a flow drill screw configured to generate a fastener aperture by locally melting material of the shock tower cap.

The shock tower cap may be fastened to the shock tower via a threaded stud and a nut embodiment of the fastener to thereby supplement the adhesive and fix the shock tower cap to the shock tower.

At least one of the shock tower and the vehicle frame rail may define a cast-in rib arranged in a plane not orthogonal to the vehicle body axis.

At least one of the plurality of braces may have a tubular aluminum construction.

The shock tower cap may define a cast-in rib.

The vehicle body structure may be an integral body and frame structure, such as either a unibody or a semi-monocoque.

A vehicle having a body structure using such a shock tower system is also disclosed.

The above features and advantages, and other features and advantages of the present disclosure, will be readily apparent from the following detailed description of the embodiment(s) and best mode(s) for carrying out the described disclosure when taken in connection with the accompanying drawings and appended claims.

BRIEF DESCRIPTION OF THE DRAWINGS

FIG. 5 is a schematic close-up cross-sectional partial view of the general shock tower system, and depicting an adhesive and one embodiment of a fastener configured to secure the brace to the shock tower cap, according to the disclosure.

FIG. 6 is a schematic close-up cross-sectional partial view of the general shock tower system, and depicting the adhesive and another embodiment of the fastener configured to secure the brace to the shock tower cap, according to the disclosure.

FIG. 7 is a schematic close-up partial cross-sectional view of the general shock tower system, and depicting the adhesive and another embodiment of the fastener configured to secure the shock tower cap to the shock tower, according to the disclosure.

DETAILED DESCRIPTION

Figure 1:
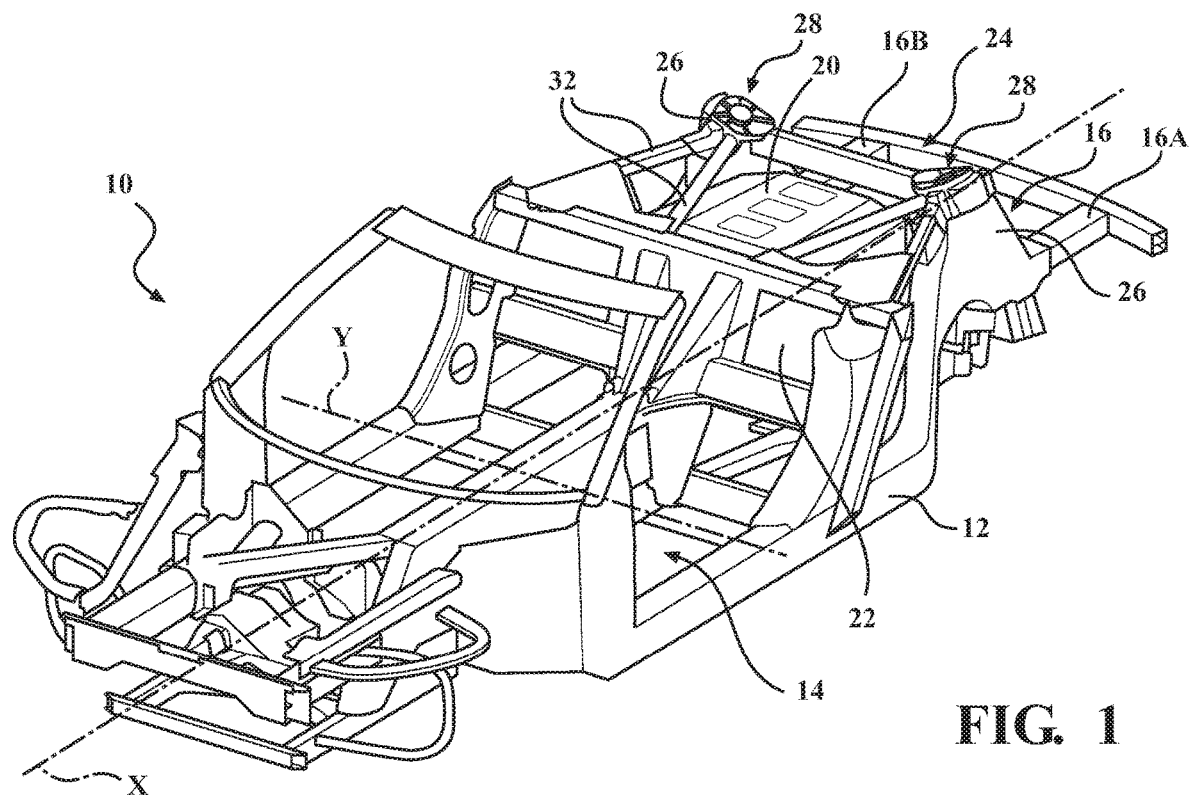
FIG. 1 is a schematic perspective partial view of an integrated vehicle body structure supporting a vehicle powertrain and having a shock tower system with shock towers, shock tower caps, and braces interconnected with a cross body bulkhead and vehicle frame rails.

Referring to the drawings, wherein like reference numbers refer to like components, FIG. 1 shows a perspective schematic outline of a vehicle 10 having a vehicle body structure 12 having a front section 12-1 and a rear section 12-2. The vehicle body structure 12 is made up of a vehicle body 14 constructed from a number of components, such as exterior body panels (not shown), sub-structures, and a frame 16. The vehicle body 14 is characterized by a longitudinal vehicle centerline or body axis that generally coincides with an X-axis and is orthogonal to a Y-axis (shown in FIG. 1).

The vehicle body 14 is attached to the frame 16, thus enabling a support structure for a vehicle suspension (not shown) and wheels, while also supporting vehicle subsystems, such as a steering system (not shown), a powertrain 18, passengers, and cargo. As shown, the frame 16 is arranged in the general plane of the vehicle 10, substantially defined by the X and Y axes. As appreciated by those skilled in the art, the disclosed vehicle body structure 12 may be used in a rear-wheel drive, a front-wheel drive, or a four-wheel drive configuration. The powertrain 18 may have an internal combustion engine 20. The powertrain 18 may be positioned proximate the front section 12-1 of the vehicle body structure 12, or proximate the rear section 12-2 (as shown in FIG. 1).

As shown, the frame 16 includes two frame rails, 16A and 16B, separated in vehicle body structure 12 by a distance D. The frame rails 16A and 16B may be substantially parallel with respect to each other, e.g., within +/−5° of true parallel and arranged substantially along the vehicle body axis. As shown, the frame rails 16A, 16B may be configured as partial rails that exclude the dashed line sections, thereby defining an integral body and frame structure. Such an integral vehicle body structure 12 lacks a separate load-carrying internal frame, and may have either a "unibody" or a "semi-monocoque" construction, as identified in the art. In the unibody construction, the frame, the floor plan, and the chassis are typically combined into a single structure which uses box sections, bulkheads, and tubes to provide most of the strength of the vehicle body, while exterior body panels add a relatively little strength or stiffness. Similar to the unibody structure, a semi-monocoque construction is an integrated structure that employs ribs, bulkheads, and box sections to reinforce the vehicle body, while the outer body panels bear a smaller portion of the structural load.

Figure 2:
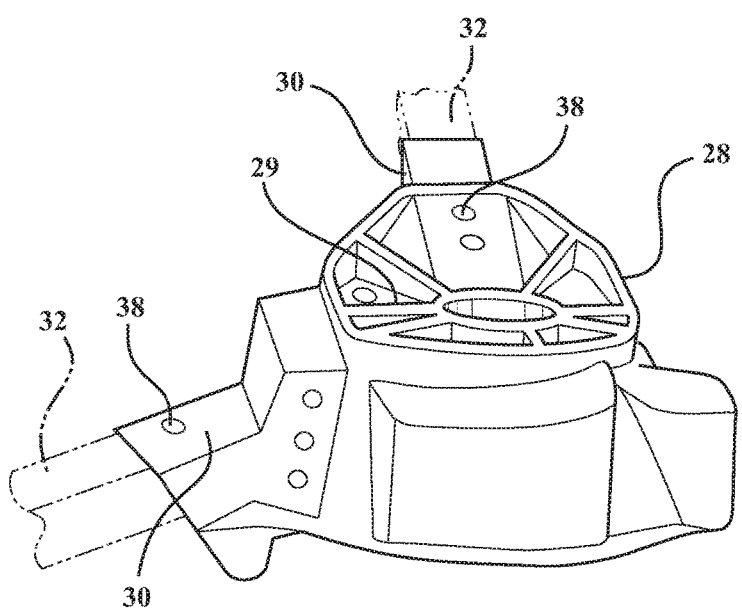
FIG. 2 is a schematic close-up perspective view of one shock tower cap shown in FIG. 1, specifically focusing on the receivers for accommodating braces, according to the disclosure.

The first and second frame rails 16A, 16B are arranged substantially symmetrically with respect to the longitudinal vehicle centerline or the X-axis. As used herein, the term "substantially symmetrically" may denote a positioning of specified components that is within +/−5 cm of true symmetry with respect to the longitudinal vehicle centerline. Frame rails 16A and 16B may be constructed from aluminum, and be formed by one or more appropriate methods, such as extrusion, hydro-forming, roll-forming, stamping, and welding. As may be seen in FIGS. 1-3, the vehicle body structure 12 also includes a bulkhead 22. The bulkhead 22 is arranged orthogonally relative to the vehicle frame rails 16A and 16B and fixed thereto, such as by welding, or other robust fastening method. Accordingly, the bulkhead 22 is arranged transverse to the vehicle body axis and may be configured as a load-bearing component connecting the vehicle frame rails 16A and 16B in either a unibody or a semi-monocoque construction.

With continued reference to FIG. 1, the vehicle body structure 12 also includes a vehicle body-variant adaptable structural shock tower system 24. The shock tower system 24 may be arranged proximate the rear section 12-2 of the vehicle body structure 12. However, the shock tower system 24 may be similarly arranged proximate the front section 12-1 of the vehicle body structure 12. The shock tower system 24 includes a pair of shock towers 26, each configured to support a vehicle shock assembly (not shown). Each shock tower 26 is spaced apart from the bulkhead 22 and fixed to the respective vehicle frame rail 16A or 16B. An individual shock tower 26 may be attached to the respective vehicle frame rail 16A or 16B via a weld(s), fastener(s), and/or an adhesive. Alternatively, an individual shock tower 26 may be formed integrally with the respective vehicle frame rail 16A or 16B, such as in a single or unitary casting therewith.

The shock tower system 24 also includes a shock tower cap, indicated generally in FIG. 1 via numeral 28, arranged on each shock tower 26. An individual shock tower cap 28 may define cast-in ribs 29 configured to enhance stiffness of the subject cap. Each shock tower cap 28 defines a plurality of receivers indicated generally in FIG. 2 via numeral 30. The receivers 30 may be defined as pockets or recesses configured to accept stiffening or structural braces that will be described in detail below. Additionally, each of the shock tower 26 and/or the vehicle frame rails 16A, 16B may define cast-in ribs 31 arranged in a plane not orthogonal, i.e., not at ninety degrees, relative to the longitudinal vehicle centerline or the X-axis (shown in FIGS. 3, 3A, 4, and 4A). Such an orientation of the ribs 31 may be facilitated by a die pull during casting of the respective components being affected along the Y axis, as seen from the perspective of the vehicle X-Y plane. The subject die pull direction may be facilitated by the shock tower 26 and/or the vehicle frame rails 16A, 16B being formed, i.e., cast, separately from the shock tower caps 28. The ribs 31 are thereby generally configured to stiffen the shock tower 26 and/or the vehicle frame rails 16A, 16B in multiple planes perpendicular to the X-axis.

The shock tower system 24 also includes a plurality of stiffening braces indicated in FIG. 1 generally via numeral 32. The brace(s) 32 may have an extruded tubular aluminum construction, and be defined by either a generally circular or rectangular cross-section. The yield strength of the brace 32 material may be in a range of 150-230 MPa. As shown, each brace 32 extends from the shock tower 26 through a respective one of the plurality of receivers 30 in the shock tower cap 28 to the bulkhead 22, and is fixed to each of the shock tower and the bulkhead. The receivers 30 are contoured to provide clearance for and accept the braces 32 positioned between the shock tower 26 and the shock tower cap 28. An adhesive 34 (shown in FIG. 5-7), such as an epoxy, is applied between the shock tower cap 28, the plurality of braces 32, and the shock tower 26, to thereby bond the shock tower cap, the plurality of braces, and the shock tower to each other and reinforce the vehicle body structure 12. The particular number of braces 32 per each shock tower 26 location may be selected in relation to the specific body-variant of the vehicle 10, as will be described in detail below. Additionally, attachment of at least some of the braces 32 to the bulkhead 22 may be strengthened by gussets 33, as specifically identified in FIGS. 3, 3A, 4, and 4A.

Figure 3:
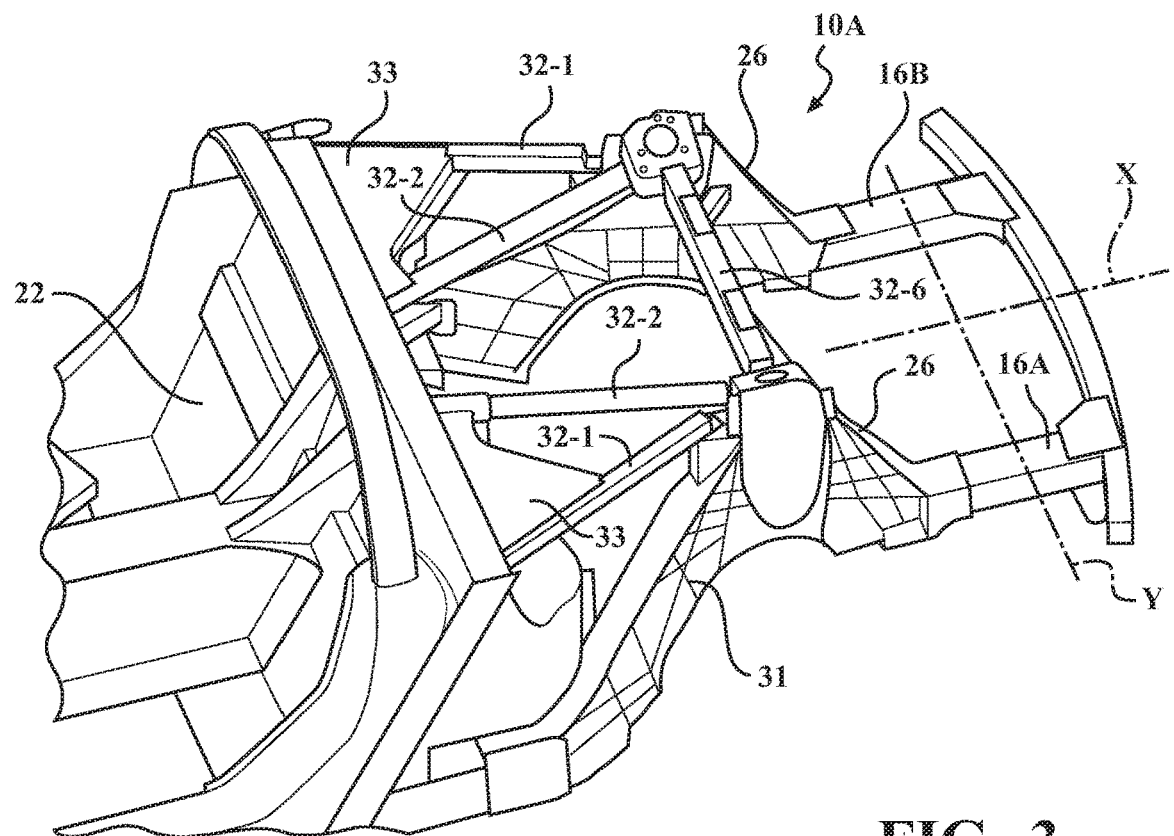
FIG. 3 is a schematic perspective partial view of a coupe body-variant of the vehicle shown in FIG. 1, depicting the body-variant specific shock tower system, but with the shock tower caps removed, according to the disclosure.
Figure 3A:
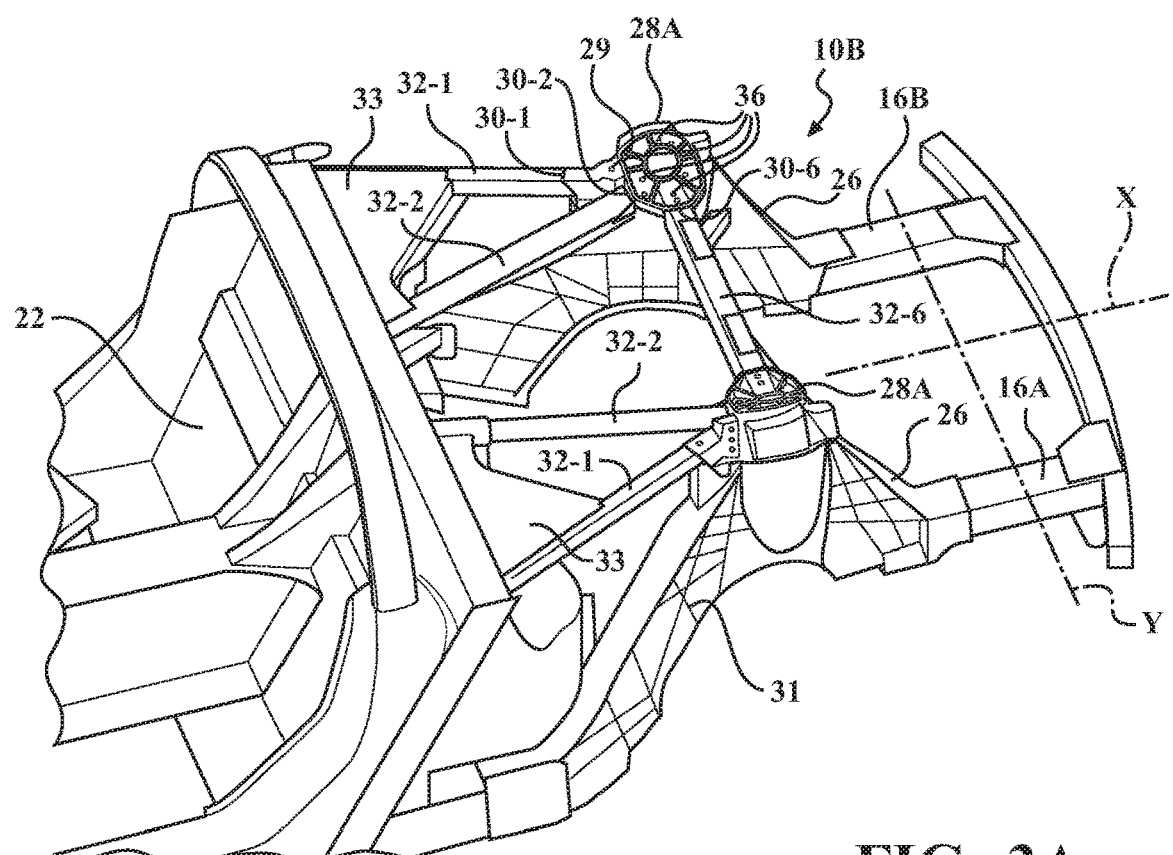
FIG. 3A is a schematic perspective partial view of the coupe body-variant shown in FIG. 3, but with the shock tower caps in place.

For example, as shown in FIGS. 3 and 3A, the vehicle body-variant may be a coupe 10A, i.e., a vehicle having a hard roof structure (not shown) arranged between A-pillars and B-pillars of the vehicle body 14. Such a hard roof structure may be either permanently fixed in place, or include one or more panels configured to be selectively removed and reinstalled, such as a targa top. Alternatively, as shown in in FIGS. 4 and 4A, the vehicle body-variant may be a convertible 10B, i.e., a vehicle having a retractable roof structure (not shown) configured to be stowed in its retracted state within the vehicle body structure 12. The retractable roof may be a soft, for example, folding fabric canopy, or a multi-sectional folding hard structure. The retractable roof structure may be configured either for manual operation or for power actuation via an actuation mechanism 15. The power actuated mechanism 15 may, for example, employ electric motor(s) and various levers, beams, etc. (not shown). Such disparate vehicle body-variants 10A and 10B may, however, introduce specific constraints necessitating distinct solutions for creating a robust vehicle body structure 12.

As noted above, the coupe 10A employing the hard roof structure, typically does not have a roof actuation mechanism arranged between bulkhead 22 and the shock towers 26. Consequently, the subject vehicle body-variant is likely to provide sufficient space between bulkhead 22 and the shock towers 26 to arrange the braces 32 at angles primarily advantageous for body structure stiffness. Accordingly, the coupe 10A vehicle body structure 12 may have two braces 32, specifically braces 32-1 and 32-2, extending from each shock tower 26 to the bulkhead 22. Each of the two braces 32-1, 32-2 shown in FIGS. 3 and 3A as part of the coupe 10A body-variant may be substantially straight members. As shown, in such an embodiment, a specific variant of the tower cap is indicated via numeral 28A. FIG. 3 depicts the coupe 10A structure prior to the shock tower cap 28A installation, while FIG. 3A depicts the subject coupe structure with the subject shock tower cap in place. Each shock tower cap 28A includes two receivers 30-1 and 30-2, one receiver for each of the two braces 32. As shown in FIGS. 3 and 3A, in the structure 14A, each of the two braces 32-1, 32-2 may extend at an angle θ equal to or greater than 20 degrees relative to the vehicle body axis. Thus, employment of the two braces 32-1, 32-2 at the complementary angles θ in the coupe 10A body-variant generates a sufficiently robust stiffening arrangement by tying the shock tower 26 to the bulkhead 22.

Figure 4:
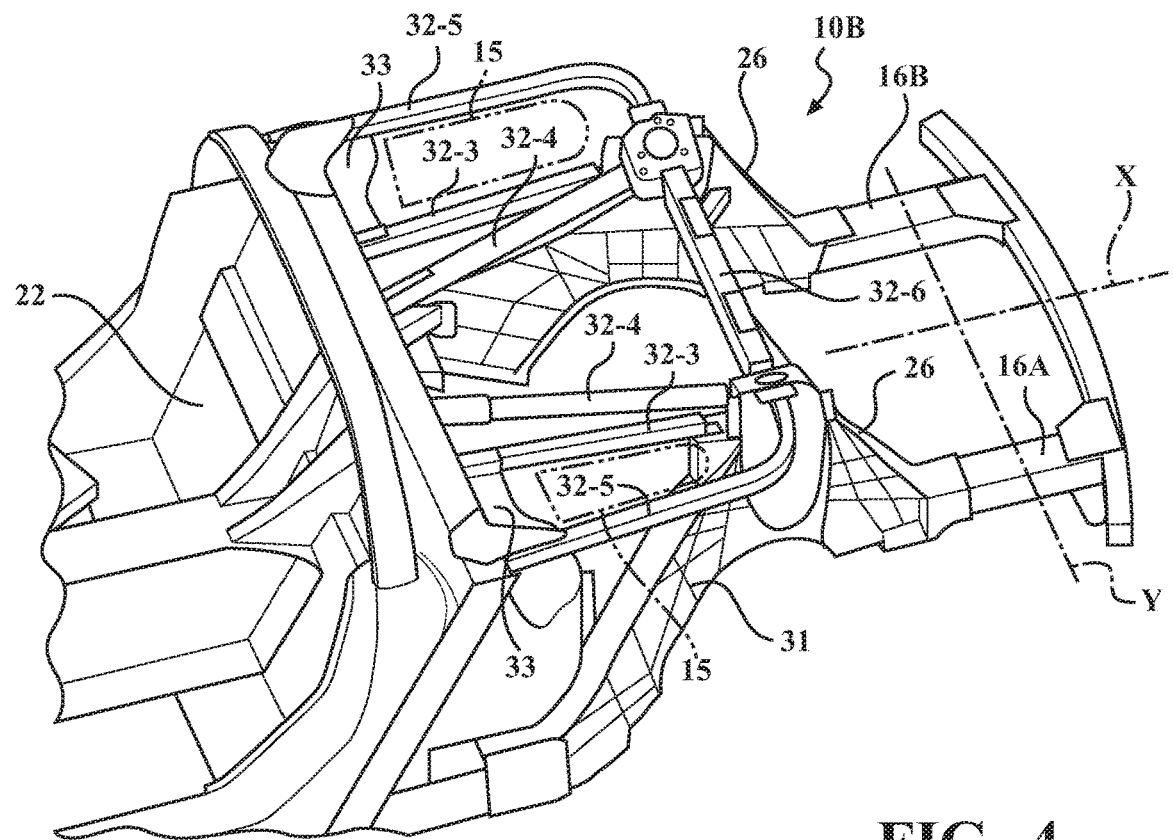
FIG. 4 is a schematic perspective partial view of a convertible body-variant of the vehicle shown in FIG. 1, depicting the body-variant specific shock tower system, but with the shock tower caps removed, according to the disclosure.
Figure 4A:
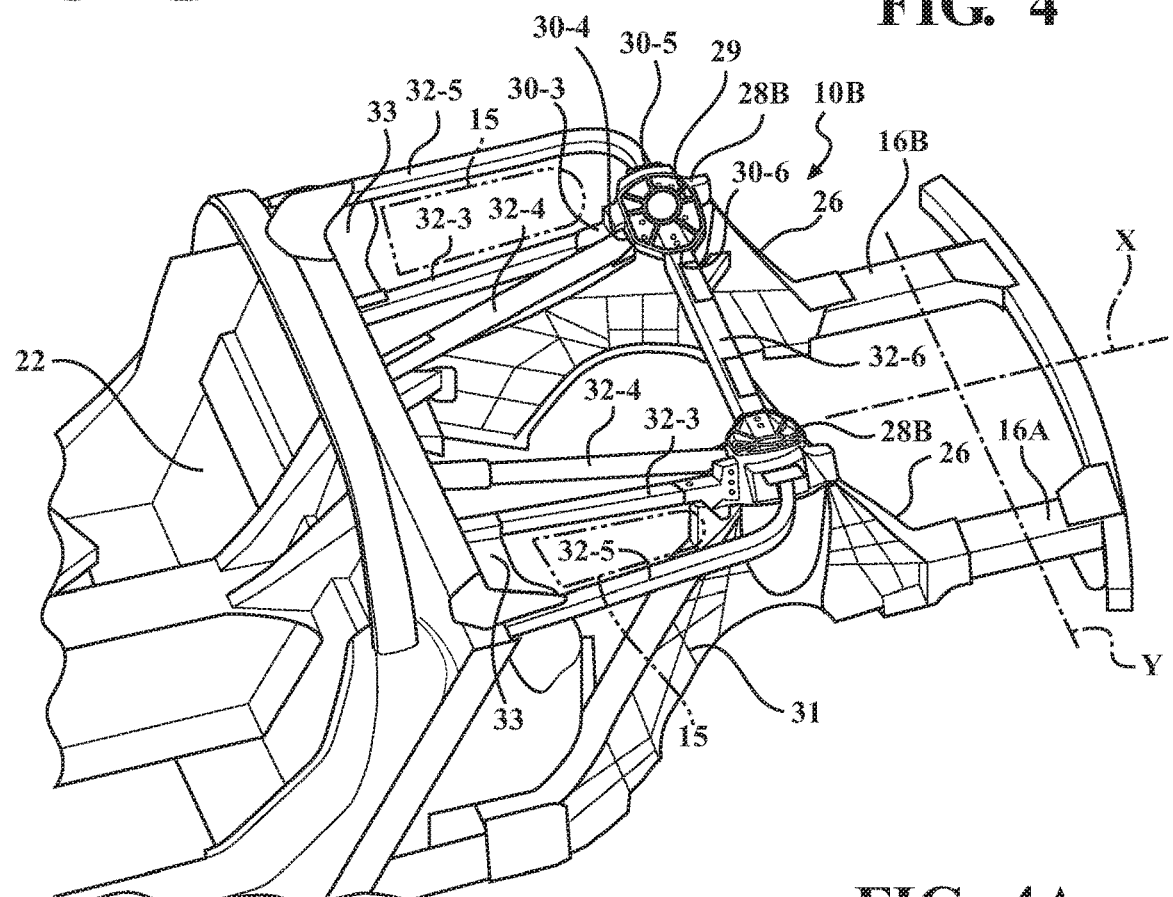
FIG. 4A is a schematic perspective partial view of the convertible body-variant shown in FIG. 4, depicting the body-variant specific shock tower system, but with the shock tower caps in place.

In the example of the convertible 10B employing the retractable roof and the actuation mechanism 15, due to electric motor(s) 15 arranged between bulkhead 22 and the shock towers 26, the vehicle body structure 12 may benefit from having three braces 32, specifically braces 32-3, 32-4, and 32-5, extending from each shock tower 26 to the bulkhead 22. As shown, in such an embodiment, a specific variant of the tower cap is indicated via numeral 28B. FIG. 4 depicts the convertible 10B structure prior to the shock tower cap 28B installation, while FIG. 4A depicts the subject convertible structure with the shock tower cap in place. Each shock tower cap 28B includes three receivers 30-3, 30-4, and 30-5, one receiver for each of the three braces 32. As shown in FIGS. 4 and 4A, a first one of the three braces 32-3, 32-4, and 32-5, such as the brace 32-3, extends at an angle θ equal to or greater than 20 degrees relative to the vehicle body axis. A second one of the three braces 32-3, 32-4, and 32-5, such as the brace 32-4, extends at an angle θ between zero and 10 degrees relative to the vehicle body axis. Each of the two braces 32-3 and 32-4 shown in FIGS. 4 and 4A as part of the convertible 10B body-variant may be substantially straight members. Furthermore, a third one of the three braces 32-3, 32-4, and 32-5, such as the brace 32-5, is a curved member extending from the shock tower 26 orthogonally relative to the vehicle frame rail 16A, 16B and extending from the bulkhead 22 along the vehicle body axis. In other words, the third brace 32-5 has a substantially right angle between its opposite ends, and connected by an intermediate section having a radius, which may, for example, be larger than a radius of the third tubular brace.

As shown in FIGS. 3, 3A, 4, and 4A, each vehicle body-variant 10A and 10B may additionally include a stiffening brace 32-6 connecting the two shock towers 26. Accordingly, the stiffening brace 32-6 is arranged substantially orthogonal to the X-axis and parallel to the Y-axis in the vehicle 10. In such an embodiment, each shock tower cap 28 may further include a respective receiver 30-6 to accommodate a connecting point of the stiffening brace 32-6 to the respective shock tower 26. In terms of function, the stiffening brace 32-6 may provide a cross-vehicle load path configured to further stiffen the vehicle body structure 12 and enable more precise tuning of the vehicle's suspension response.

Generally, aluminum die-castings are susceptible to defects and inconsistencies, such as gas porosity, shrinkage porosity, oxide or other inclusions, and incomplete die fill. Such defects may negatively impact the finished component reliability and strength. A particular "high-integrity" die-casting process, where vacuum is generated in, i.e., the air is pulled out of, the die cavity with the aid of a controlled vacuum valve (not shown), may be used to address such potential defects in aluminum die-castings. Specifically, the vacuum generated in the die may be in a range of 20-300 mbar. Some aluminum alloys are particularly well suited to the high-integrity die-casting process, such as aluminum-silicone and aluminum-magnesium-silicone families of alloys, where silicone and magnesium are used to enhance mechanical properties of the casting.

The shock tower 26 may be formed as a high-integrity aluminum die-casting, specifically from aluminum-silicone or aluminum-magnesium-silicone using the above vacuum casting process. In other words, the shock tower 26 may be formed using the vacuum die casting process, thereby resulting in a component having low porosity, high elongation, and consistent properties. Additionally, wall thicknesses of the shock tower 26 may be controlled more tightly and be reduced for a specific required yield strength or achieve a higher strength without increasing component thickness and mass. As a result of the subject high-integrity die-casting process, the yield strength of the shock tower 26 material may be in a range of 130-160 MPa. Similarly, the shock tower cap 28 may also be a high-integrity aluminum die-casting, with the yield strength of the shock tower cap material in a comparable range of 130-160 MPa. Additionally, the shock tower 26 material may be steel or an engineered composite the achieves the above yield strength specification.

The reinforced bulkhead 22 may additionally include at least one fastener 36 configured to extend through the shock tower cap 28, the respective brace 32, and into the shock tower 26. The specific number and location of fasteners 36 may be selected based on the number of braces 32 used in the particular vehicle body-variant. For example, each shock tower 26 location may include three or more fasteners 36 substantially equally spaced around the circumference of the shock tower cap 28. Also, each shock tower cap 28 location being fastened to the respective brace 32 may employ a plurality of fasteners 36, as well as areas where the shock tower cap is fastened directly to the shock tower 26. The fastener(s) 36 are thereby configured to supplement the adhesive 34 to fix the shock tower cap 28 to the shock tower 26, trap the braces 32 in place and generate an enhanced stiffness vehicle body structure 12.

Each of the shock tower 26 and the shock tower cap 28 may define a pre-generated such as pre-formed, pre-machined, or pre-drilled, respective part of an aperture(s) 38 configured to accept the fastener 36. In such an embodiment, each of the fasteners 36 may be a blind rivet (shown in FIG. 5). A blind rivet assembly includes a tubular rivet shaft and a mandrel through the center of the shaft. The blind rivet assembly embodiment of the fastener 36 is intended to be inserted into the pre-generated aperture 38 and expanded therein, following which the mandrel snaps off. The fastener 36 may also be a bolt configured to extend through the pre-generated aperture 38 in the shock tower cap 28, the respective brace 32, and the shock tower 26, and thread into a nut attached, e.g., welded to, the shock tower (not shown).

Alternatively, the shock tower 26 and the shock tower cap 28 may be characterized by an absence of pre-generated aperture(s), such as the pre-formed, pre-machined, or pre-drilled aperture 38, for accepting the fastener(s) 36. In such an embodiment, each of the fasteners 36 may be a flow drill screw (shown in FIG. 6). A drill screw embodiment of the fastener 36 may be configured to generate the fastener aperture 38 (shown in FIGS. 2 and 5) through each of the shock tower cap 28, the respective brace 32, and the shock tower 26. The fastener aperture 38 is hence generated via the screw 36 drilling and locally melting material of the shock tower cap, the subject brace, and the shock tower in its path, as the screw is driven into place to secure the shock tower system 24. Additionally, as shown in FIG. 7, where the shock tower cap 28 is fastened directly to the shock tower 26, in addition to or in lieu of the adhesive 34, the fastener(s) 36 used may be threaded stud(s) and nut(s).

Overall, the adaptable structural shock tower system 24, including the specific configuration and number of braces 32 extending between the shock towers 26 and the bulkhead 22, and sandwiched between the respective shock towers and shock tower caps 28, may be employed to generate a high-stiffness section of the vehicle body structure 12. Such a high-stiffness section may be the front section 12-1 or the rear section 12-2 of the vehicle body structure 12. The resultant vehicle body structure 12 may be used to establish a robust foundation for a passenger vehicle, such as the vehicle 10, i.e., a more effective platform for the vehicle's powertrain 18, passengers, and cargo, and provide a stiffer structure irrespective of the vehicle body-variant 10A, 10B, and space constraints in the area between the shock towers 26 and the bulkhead 22.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. A vehicle body-variant adaptable shock tower system for a vehicle body structure having a vehicle body axis, a vehicle frame rail arranged along the vehicle body axis, and a bulkhead arranged orthogonally relative to the vehicle frame rail, the shock tower system comprising:
    a shock tower spaced apart from the bulkhead and fixed to the vehicle frame rail;
    a shock tower cap defining a plurality of receivers;
    a plurality of braces, wherein a number of the braces corresponds to the vehicle body-variant, and wherein each of the braces extends from the shock tower through a respective one of the plurality of receivers to the bulkhead, and is fixed to the shock tower and the bulkhead; and
    an adhesive applied between the shock tower cap, the plurality of braces, and the shock tower to thereby bond the shock tower cap, the plurality of braces, and the shock tower to each other and reinforce the vehicle body structure.

2. The shock tower system of claim 1, wherein:
    the vehicle body-variant is a coupe;
    the plurality of braces is two braces; and
    each of the two braces extends at an angle equal to or greater than 20 degrees relative to the vehicle body axis.

3. The shock tower system of claim 1, wherein:
    the vehicle body-variant is a convertible;
    the plurality of braces is three braces; and
    a first one of the three braces extends at an angle equal to or greater than 20 degrees relative to the vehicle body axis, a second one of the three braces extends at an angle between zero and 10 degrees relative to the vehicle body axis, and a third one of the three braces is a curved member extending from the shock tower orthogonally relative to the vehicle frame rail and extending from the bulkhead along the vehicle body axis.

4. The shock tower system of claim 1, wherein the shock tower is formed as a high-integrity aluminum die-casting.

5. The shock tower system of claim 4, wherein yield strength of the material of the shock tower is in a range of 130-160 MPa.

6. The shock tower system of claim 1, wherein the shock tower cap is a high-integrity aluminum die-casting.

7. The shock tower system of claim 6, wherein yield strength of the material of the shock tower cap is in a range of 130-160 MPa.

8. The shock tower system of claim 1, further comprising a fastener configured to extend through shock tower cap and into one of the plurality of braces to thereby supplement the adhesive and fix the shock tower cap to the respective brace.

9. The shock tower system of claim 8, wherein the shock tower cap defines a pre-generated aperture configured to accept the fastener, and wherein the fastener is a blind rivet.

10. The shock tower system of claim 8, wherein the shock tower cap is characterized by an absence of a pre-generated aperture configured to accept the fastener, and wherein the fastener is a flow drill screw configured to generate a fastener aperture by locally melting material of the shock tower cap.

11. A vehicle comprising:
a vehicle body structure having a vehicle body axis and a vehicle frame rail arranged along the vehicle body axis;
a bulkhead arranged orthogonally relative to the vehicle frame rail and fixed thereto; and
a vehicle body-variant adaptable structural shock tower system including:
a shock tower spaced apart from the bulkhead and fixed to the vehicle frame rail;
a shock tower cap defining a plurality of receivers;
a plurality of braces, wherein a number of the braces corresponds to the vehicle body-variant, and wherein each of the braces extends from the shock tower through a respective one of the plurality of receivers to the bulkhead, and is fixed to the shock tower and the bulkhead; and
an adhesive applied between the shock tower cap, the plurality of braces, and the shock tower to thereby bond the shock tower cap, the plurality of braces, and the shock tower to each other and reinforce the vehicle body structure.

12. The vehicle of claim 11, wherein:
the vehicle body-variant is a coupe;
the plurality of braces is two braces; and
each of the two braces extends at an angle equal to or greater than 20 degrees relative to the vehicle body axis.

13. The vehicle of claim 11, wherein:
the vehicle body-variant is a convertible;
the plurality of braces is three braces; and
a first one of the three braces extends at an angle equal to or greater than 20 degrees relative to the vehicle body axis, a second one of the three braces extends at an angle between zero and 10 degrees relative to the vehicle body axis, and a third one of the three braces is a curved member extending from the shock tower orthogonally relative to the vehicle frame rail and extending from the bulkhead along the vehicle body axis.

14. The vehicle of claim 11, wherein the shock tower is formed as a high-integrity aluminum die-casting having a yield strength in a range of 130-160 MPa.

15. The vehicle of claim 11, wherein the shock tower cap is a high-integrity aluminum die-casting.

16. The vehicle of claim 15, wherein yield strength of the material of the shock tower cap is in a range of 130-160 MPa.

17. The vehicle of claim 11, further comprising a fastener configured to extend through shock tower cap and into one of the plurality of braces to thereby supplement the adhesive and fix the shock tower cap to the respective brace.

18. The vehicle of claim 17, wherein the shock tower cap defines a pre-generated aperture configured to accept the fastener, and wherein the fastener is a blind rivet.

19. The vehicle of claim 17, wherein the shock tower cap is characterized by an absence of a pre-generated aperture configured to accept the fastener, and wherein the fastener is a flow drill screw configured to generate a fastener aperture by locally melting material of the shock tower cap.

20. A vehicle body-variant adaptable shock tower system for a vehicle body structure having a vehicle body axis, a vehicle frame rail arranged along the vehicle body axis, and a bulkhead arranged orthogonally relative to the vehicle frame rail, the shock tower system comprising:
a shock tower spaced apart from the bulkhead and fixed to the vehicle frame rail;
a shock tower cap defining a plurality of receivers;
a plurality of braces, wherein a number of the braces corresponds to the vehicle body-variant, and wherein each of the braces extends from the shock tower through a respective one of the plurality of receivers to the bulkhead, and is fixed to the shock tower and the bulkhead;
an adhesive applied between the shock tower cap, the plurality of braces, and the shock tower to thereby bond the shock tower cap, the plurality of braces, and the shock tower to each other and reinforce the vehicle body structure; and
a fastener configured to extend through shock tower cap and into one of the plurality of braces to thereby supplement the adhesive and fix the shock tower cap to the respective brace.

* * * * *